(12) United States Patent
Schroeder et al.

(10) Patent No.: US 8,204,523 B1
(45) Date of Patent: Jun. 19, 2012

(54) COST EFFECTIVE NOTIFICATIONS WITH DELIVERY GUARANTEE

(75) Inventors: Derek Schroeder, Caldwell, NJ (US);
Madhu Bharathula, Somerset, NJ (US);
James Kearns, Lincoln Park, NJ (US);
Venkat Gaddam, Bridgewater, NJ (US);
Julie Weinstein, West Nyack, NY (US)

(73) Assignee: Cellco Partnership, Basking Ridge, NJ (US)

( * ) Notice: Subject to any disclaimer, the term of this patent is extended or adjusted under 35 U.S.C. 154(b) by 411 days.

(21) Appl. No.: 12/614,021

(22) Filed: Nov. 6, 2009

Related U.S. Application Data

(60) Provisional application No. 61/112,337, filed on Nov. 7, 2008.

(51) Int. Cl.
*H04W 4/00* (2009.01)
*H04M 11/00* (2006.01)

(52) U.S. Cl. ........................................ 455/466; 455/406

(58) Field of Classification Search .................. 455/466, 455/405–408, 412.2, 414.1–414.2, 418–420
See application file for complete search history.

(56) References Cited

U.S. PATENT DOCUMENTS

| | | | |
|---|---|---|---|
| 6,829,591 B1 | 12/2004 | Bresnan et al. | |
| 7,274,943 B2 | 9/2007 | Trossen | |
| 2003/0074456 A1* | 4/2003 | Yeung et al. | 709/229 |
| 2007/0111706 A1* | 5/2007 | Kumar et al. | 455/406 |

OTHER PUBLICATIONS

U.S. Appl. No. 11/785,448, filed Apr. 18, 2007 to Dunne et al.
U.S. Appl. No. 12/264,492, filed Nov. 24, 2008 to Schroeder et al.

* cited by examiner

*Primary Examiner* — Brandon Miller

(57) ABSTRACT

A first notification indicating a change on an account of a mobile station is generated and sent to an account holder of the mobile station via a first delivery procedure, when the change on the account of the mobile station occurs. The first notification is sent to the account holder only if a destination for the first delivery procedure has not changed for at least a predetermined period. A second notification of the change on the account of the mobile station is sent to the account holder via a second delivery procedure, if the first notification is not successfully sent to the account holder. Additional notifications of the change on the account of the mobile station may be sent to the account holder via respective different delivery procedures consecutively until any of the notification is successfully sent to the account holder. The first, the second and the various delivery procedures are among a Short Message Service (SMS) message, an Enhance Messaging Service (EMS), a Multimedia Messaging Service (MMS), an email, a fax, a voice call and a letter. Order of the delivery procedures to be sent may be determined based on cost for sending the notifications.

43 Claims, 5 Drawing Sheets

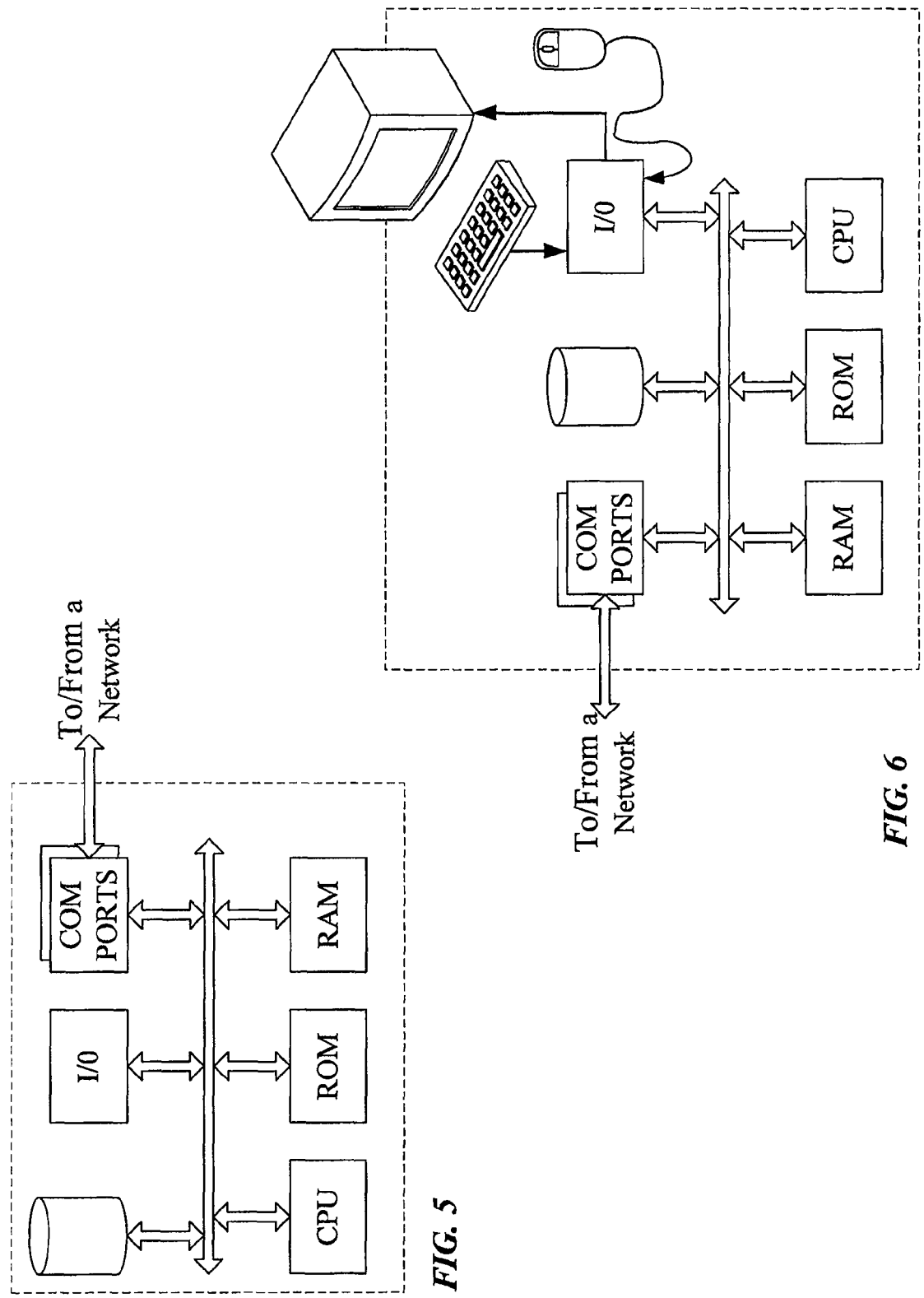

COST EFFECTIVE NOTIFICATIONS WITH DELIVERY GUARANTEE

RELATED APPLICATIONS

This application claims the benefit of U.S. Provisional Application No. 61/112,337 Filed Nov. 7, 2008 entitled, "COST EFFECTIVE NOTIFICATIONS WITH DELIVERY GUARANTEE," the disclosure of which also is entirely incorporated herein by reference.

TECHNICAL FIELD

The disclosure herein relates to techniques and equipment to provide reliable notification to a subscriber of a mobile service when there has been a change, e.g. through on-line access, in the subscriber's mobile service account. The notification processing may also update appropriate account records with the changed information.

BACKGROUND

In recent years, mobile wireless communications have become increasingly popular. Initial implementations of mobile Wireless communications, for example in the form of cellular telephone networks, supported circuit switched voice communication services. The carriers developed short message service (SMS) technology to provide text and/or email communications via the wireless communication networks. As the public wireless communication networks have evolved to provide greater bandwidth and packet based services, the industry has developed a variety of data services, such as web browsing, as well as a variety of services using multimedia message service (MMS) technology.

As popularity and demand has grown, subscribers have increasingly obtained service for a number of mobile stations (with individual mobile directory numbers or "MDNs") under one mobile subscriber account with the carrier providing services through the mobile communication network. For example, a family may have mobile phones for both parents as well as a mobile phone for one or more of their children. Verizon Wireless, for example, currently offers private customers up to five stations/numbers under one account/billing subscription.

There have also been situations in which notifications were provided to account holders. For example, a recent FCC Mandate requires a communication to the account holder or subscriber when certain pertinent information on an account is changed, such as when the account password or billing plan had been changed via web access or as a result of a phone call or in-store communication with customer service personnel. There are any number of different techniques to send such notifications that will satisfy the FCC mandate. However, the cost to send the change notification to the customer varies depending on the notification method used.

To insure effective communication of such notifications, Verizon Wireless implemented a hierarchical delivery approach, which utilized one or more electronic delivery methods as the first attempts, which tends to ensure that the communication reaches the customer quickly and at the least cost. When each method was exhausted, a more costly communication method would be employed. For example, a first try might involve sending an SMS message to the account holder, then if the SMS delivery is not successful, the next try might involve sending an email. However, with such past notification systems or techniques, failed SMS notifications were only reattempted with email notifications. Hence, there were still instances where communication attempts might fail (after SMS and email failure) with no further attempts, resulting in situations with little or no likelihood that the subscriber would receive actual notice of the account change. Also, there was not a temporal check on the notification addresses. As a result, notifications might be sent with very recent address information, which actually is more likely to be inaccurate.

Hence, further improvement is possible. It is desirable to allow significant account data changes to be cost effectively communicated to the customer, preferably with a high likelihood of success.

SUMMARY

The teachings herein alleviate one or more of the above noted problems with a method for providing notifications of changes on a mobile station's account to a holder of the mobile station's account. A change on a mobile station's account stored in a customer account server is detected, and, upon detection of the change, destination information on the holder of the mobile station's account is retrieved from a database storing the destination information of the holder of the mobile station's account. The retrieved destination information includes information for a plurality of respective destinations for the holder for a plurality of different delivery procedures. It is determined whether or not a first destination for a first one of the delivery procedures has not changed for at least a predetermined period. A first notification of the change on the mobile station's account is sent to the holder of the mobile station's account via a first delivery procedure according to the first destination, only if the first destination for the first delivery procedure has not changed for at least the predetermined period.

A second notification of the change on the mobile station's account is sent to the holder of the mobile station's account via a second delivery procedure, upon a determination that the first notification has not been successfully sent to the holder of the mobile station's account. If the second notification is not successfully sent to the holder of the mobile station's account, an additional notification of the change on the mobile station's account is sent consecutively via a different delivery procedure.

It is determined whether or not a second destination for the second delivery procedure and/or the destinations for the different delivery procedure have not been changed for at least the predetermined period. The second notification and the additional notification are sent to the holder when the second destination and the destination for the different delivery procedure have not been changed for at least the predetermined period.

In a practical example, the change on the mobile station's account may include any of change of address, change of an email address, change of password and change of identification of the account holder. Each of the first, the second, and the different ways of delivery may be one of a Short Message Service (SMS) message, an Enhance Messaging Service (EMS) message, a Multimedia Messaging Service (MMS) message, an email, a fax, a voice call and a letter. Exemplary stored destination information includes a Mobile Directory Number (MDN) of the account holder's mobile station and an email address, a fax number, a landline telephone number, and a postal address of the account holder.

One of the destinations for the first, the second and the additional notification is recorded in the database if the one of the first, the second and the additional notification is successfully sent to the account holder. A fall out file including the account holder identification, the change of the account and types of failed notifications is recorded if all of the first, the second and the additional notifications are not successfully sent to the account holder.

The first delivery procedure may be less costly than the second delivery procedure, and the second delivery procedure may be less costly than the different delivery procedure.

Another aspect of the disclosure encompasses a system for providing notifications of changes on a mobile station's account to a holder of the mobile station's account. The system includes a database for storing information on mobile stations' accounts and destination information on holders of the mobile stations' accounts, a customer account server for detecting a change on a mobile station's account, and a customer communication server. The communication server sends a first notification of a change on a mobile station's account to the holder of the mobile station's account via a first delivery procedure, upon detection of the change on the mobile station's account by the customer account server. The first notification is sent to the account holder when a first destination for the first delivery procedure has not been changed for at least a predetermined period.

If the first notification is not successfully sent to the account holder, the customer communication server sends a second notification to the account holder via a second delivery procedure. If the second notification is not successfully sent to the account holder, the customer communication server sends an additional notification of the change on the mobile station's account consecutively via a different-delivery procedure.

In a practical example, each of the first, the second, and the different delivery procedures may use one of a Short Message Service (SMS) message, an Enhanced Messaging Service (EMS) message, a Multimedia Messaging Service (MMS) message, an email, a fax, a voice call and a letter. The change on the mobile station's account may be a change of address, change of email address, a change of password or a change of identification of the account holder. Exemplary stored destination information includes a Mobile Directory Number (MDN) of the account holder's mobile station and an email address, a fax number, a landline telephone number, and a postal address of the account holder.

The first delivery procedure may use a SMS message, the destination information may be a MDN of the mobile station of the account holder, and the SMS message may be sent to the mobile station via a wireless network. The second delivery procedure may use email, the destination information may be an email address of the account holder, and the email message may be sent to the email address of the account holder via an email server. The last one of the different delivery procedure may be a letter, in which case the destination information used is the postal address of the account holder.

One of the destinations for the first, the second and the additional notification may be recorded in the database, if the one of the first, the second and the additional notification are successfully sent to the account holder. The first delivery procedure may be less costly than the second delivery procedure, and the second delivery procedure may be less costly than the different delivery procedure. A fallout file including data indicating the account holder, the change of the account, and types of failed notifications is recorded in the database if all of the first, the second and the additional notification are not successfully sent to the account holder.

Another aspect of the disclosure encompasses a processor-readable storage medium tangibly embodying a set of processor-executable instructions. Execution of the instructions causes a processor to perform functions such as detecting a change on a mobile station's account stored in a database, retrieving destination information on the holder of the mobile station's account from the database storing the destination information of the holder of the mobile station's account, and sending a first notification of the change on the mobile station's account to the holder of the mobile station's account via a first delivery procedure according to the destination information. The retrieved destination information includes information for a plurality of respective destinations for the holder for a plurality of different delivery procedures. It is determined whether or not a first destination for a first one of the delivery procedures has not changed for at least a predetermined period. The first notification is sent to the account holder only if the first destination for the first delivery procedure has not changed for at least the predetermined period.

The execution of the instructions may further enable sending of a second notification of the change on the mobile station's account to the holder of the mobile station's account via a second delivery procedure, if the first notification is not successfully sent to the holder of the mobile station's account. If the second notification is not successfully sent to the holder of the mobile station's account, an additional notification of the change on the mobile station's account is sent consecutively via a different delivery procedure.

One of the destinations for the first, the second and the additional notifications may be recorded in the database, if any of the first, the second and the additional notifications are successfully sent to the account holder. The first delivery procedure may be less costly than the second delivery procedure, and the second delivery procedure may be less costly than the delivery procedures.

Another aspect of the disclosure encompasses a method for providing notifications of changes on a mobile station's account to a holder of the mobile station's account. A change on a mobile station's account stored in a database is detected, and destination information on the holder of the mobile station's account is retrieved from the database storing the destination information of the holder of the mobile station's account. The retrieved destination information includes a field for an email address of the mobile station's account holder and an identification of at least one of the possible destination for notifications of change on the mobile station's account. A first notification of the change on the mobile station's account is sent to the holder of the mobile station's account using the retrieved destination information, and, upon determining that the field for the email address does not contain an address meeting a predetermined criteria, an email address is obtained from the holder of the mobile station's account. The obtained email address is populated into the email address field of the destination information.

The first notification is sent as an email using an initial email address contained in the field, and initial email address is identified as a wrong email address for the holder upon a failure of delivery of the email first notification. The obtaining step includes notifying the account holder that the email address is the wrong email address via a different delivery procedure, requesting the account holder to update the correct email address, and receiving the correct address provided from the account holder in the database.

The first notification of the change on the mobile station's account may be sent to the holder of the mobile station's account via the email, only if the email address of the holder has not changed for at least a predetermined time. A second notification of the change on the mobile station's account may be sent to the holder of the mobile station's account via a different delivery procedure when the first notification is not successfully sent to the holder. The email address of the holder may be stored in the database as the email address of the holder when the first notification is successfully sent to the holder.

Another aspect of the disclosure encompasses a processor-readable storage medium tangibly embodying a set of processor-executable instructions, and execution of the instructions causes a processor to detect a change on a mobile station's account stored in a database, and to retrieve destination information on the holder of the mobile station's account from the database storing the destination information of the holder of the mobile station's account. The retrieved destination information includes a field for an email address of the mobile station's account holder and an identification of at least one of the possible destination for notifications of change on the mobile station's account. A first notification of the change on the mobile station's account is sent to the holder of the mobile station's using the retrieved destination information. Upon determining that the field for the email address does not contain an address meeting a predetermined criteria, an email address may be obtained from the holder of the mobile station's account. The obtained email address is populated into the email address field of the destination information.

The first notification may be sent as an email using an initial email address contained in the field, and the initial email address is identified as a wrong email address for the holder upon a failure of delivery of the email first notification.

The obtaining step includes notifying the account holder that the email address is the wrong email address via a different delivery procedure, requesting the account holder to update the correct email address, and receiving the correct address provided from the account holder in the database.

The first notification of the change on the mobile station's account may be sent to the holder of the mobile station's account via the email, only if the email address of the holder has not changed for at least a predetermined time. A second notification of the change on the mobile station's account is sent to the holder of the mobile station's account via a different delivery procedure when the first notification is not successfully sent to the holder. The email address of the holder may be stored in the database as the email address of the holder when the first notification is successfully sent to the holder.

As a result, any significant changes on an account of a mobile station can be communicated to the account holder cost-effectively and in a manner to secure a receipt of a notification of changes on the account of the mobile station.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures in attached Appendix III depict concepts by way of example, not by way of limitations. In the figures, like reference numerals refer to the same or similar elements.

FIG. 5 is a simplified functional block diagram of a computer that may be configured as a host or server.

FIG. 6 is a simplified functional block diagram of a personal computer or other work station or terminal device.

DETAILED DESCRIPTION

Figure 1:
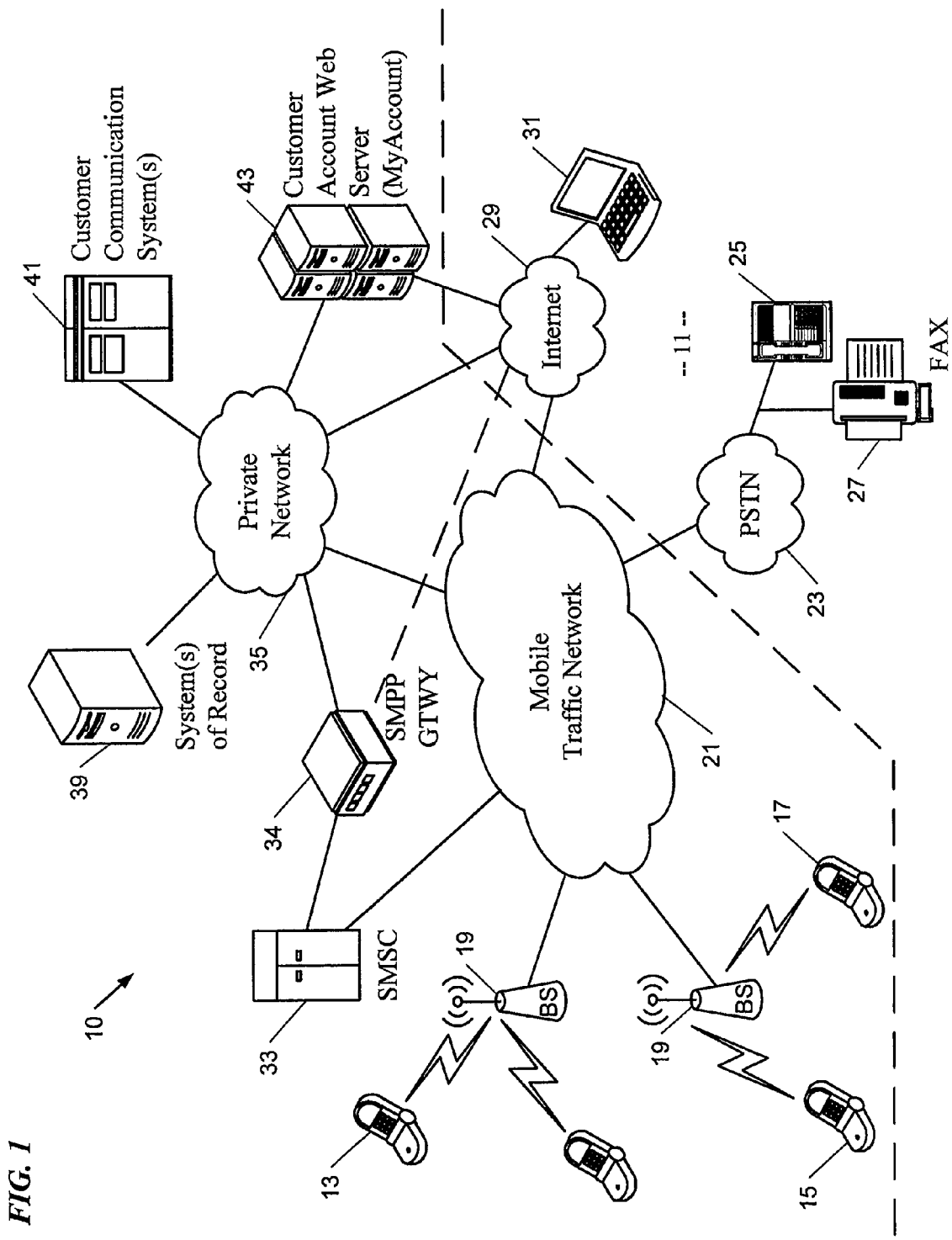
FIG. 1 is a functional block diagram useful in understanding networked elements/systems that may be used in providing mobile service subscribers various notifications, upon occurrence of certain types of changes in the subscribers' accounts.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various examples disclosed herein relate to technologies for providing reliable notifications to a mobile service subscriber, particularly in the event of one of a number of specific types of changes to the subscriber's account with a mobile network service provider or carrier. The exemplary implementation chains notification delivery logic in the most cost effective way that will provide at least a substantial guarantee of delivery. In the examples, the notification process works through a hierarchy of possible notification transmission procedures, from a least expensive transmission procedure to progressively more expensive transmission procedure, in the event less expensive communications prove unsuccessful, including for example, delivery attempts that extend beyond methods or procedures for electronic message delivery. In this way, the notification service can provide a high degree of likelihood that the subscriber will actually receive the notification.

At least some delivery attempts may involve a confidence check of the applicable destination address. For example, the notification may be sent via a particular procedures only if the applicable destination address is sufficiently reliable, e.g. because it has not been changed for some set period of time. The confidence determination regarding the delivery address also helps to reduce failed delivery attempts using possibly inaccurate address information, and thereby increase the overall success rate for notification communications.

In an example, when customers change significant account related information such as their address, email address, account challenge question associated with on-line account access, associated account password, associated account secondary email addresses, or Vision password, a Customer Communication Enterprise Solutions (CCES) system will send a notification to the customer following specific notification logic and provide fallout files by area when the notification cannot be made. An exemplary implementation utilizes an enterprise middleware web service, referred to as CCC or Centralized Customer Communications, which is written in Java. The CCC enterprise middleware web service receives notification requests in the form of XML via HTTP or MQ, and follows business rules to send customer notifications and may update one or more systems of record to reflect the changed account information. CCC utilizes the CCES web services to facilitate the sending of text message, Email, letter, and fax notifications.

The exemplary implementation works with various other carrier systems that may detect a need for subscriber notification, such as a web site access to change subscription account information. The exemplary implementation, however, provides the various functions in support of the notification service from one or more systems specifically configured to generate and send the notification, for example, so as to minimize the burden on the other systems of the carrier. As a result, the notification service system(s) can be easily scaled to meet increased demands for providing a variety of notifications to a large number of mobile subscribers/users, yet allow the carrier's other systems to continue to efficiently handle their normal operations.

Hence, the techniques and equipment described by way of example herein allow CPNI changes to be cost effectively communicated to the customer. Further improvements might include additional notification types (e.g. Fax, IVR System, or other communication methods) that could be chained to further reduce the cost of notification.

Reference now is made in detail to the examples illustrated in the accompanying drawings and discussed below. FIG. 1 illustrates a number of mobile stations, a mobile communication network coupled to other communication networks and several systems/elements associated with or included in the mobile network for various functions as may be involved in managing subscriber accounts, allowing subscribers to change at least some account information and provide attendant subscriber notifications of the changes.

Hence, FIG. 1 illustrates a mobile communication network 10 as may be operated by a carrier or service provider to provide a wide range of mobile communication services and ancillary services or features to its subscriber customers and associated mobile station (MS) users. The elements generally indicated by the reference numeral 10 generally are elements of the network and are operated by or on behalf of the carrier, although the mobile stations typically are sold to the carrier's customers. The mobile communication network 10 provides communications between mobile stations as well as communications for the mobile stations with networks and stations 11 outside the mobile communication network 10.

For purposes of later discussion, several mobile stations appear in the drawing, to represent examples of the mobile stations that may receive various services via the mobile communication network 10. Today, mobile stations typically take the form of portable handsets, smart-phones or personal digital assistants, although they may be implemented in other form factors. For discussion of some of the notification scenarios, we will assume that the mobile stations 13, 15 and 17 and their associated MDNs are all covered under one subscriber account, and that among those stations, the mobile station 13 is the station of the account holder (AH).

The network 10 allows users of the mobile stations to initiate and receive telephone calls to each other as well as through the public switched telephone network (PSTN) and telephone stations connected thereto. The network 10 allows SMS type text messaging between mobile stations and similar messaging with other devices via the Internet. The network 10 typically offers a variety of other data services via the Internet, such as downloads, web browsing, email, etc.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements, such as the MMSCs. A regional portion of the network 10, such as that serving mobile stations 13, 15 and 17, will typically include one or more RANs and a regional circuit and/or packet switched network and associated signaling network facilities.

Physical elements of a RAN operated by one of the mobile service providers or carriers, include a number of base stations represented in the example by the base stations (BSs) 19. Although not separately shown, such a base station 19 typically comprises a base transceiver system (BTS) which communicates via an antennae system at the site of base station and over the airlink with one or more of the mobile stations 13, 15 and 17, when the mobile stations are within range. Each base station typically includes a BTS coupled to several antennae mounted on a radio tower within a coverage area often referred to as a "cell." The BTS is the part of the radio network that sends and receives RF signals to/from the mobile stations that the base station currently serves.

The radio access networks also include a traffic network represented generally by the cloud at 21, which carries the user communications for the mobile stations 13, 15 and 17 between the base stations and other elements with or through which the mobile stations communicate. Individual elements such as switches and/or routers forming the traffic network 21 are omitted here for simplicity.

A Mobile Directory Number (MDN) or Mobile Telephone Number (MTN) is the telephone number assigned to a mobile station, which a calling party or device inputs in order to call or send a message to the particular mobile station. To call the mobile station 15, for example, a user of a PSTN telephone or of another mobile station dials the MDN associated with the mobile station 15. To send a MMS message or a SMS message to destination mobile station 15, as another example, typically entails input of the MDN of that mobile station. A Mobile Identification Number (MIN) is an identification number used by the network 10 to signal a particular mobile station. The MIN is formatted like a telephone number, and the MIN may be the same as the MDN. However, increasingly, the network assigns a different number for use as the MIN and translates the MDN input by a calling or other originating party into the MIN that the network 10 uses to establish the call or send the message to the destination mobile station. Of these numbers assigned to the mobile station, the MDN typically is the number or address of the station known and used by other parties or stations and is the number or address of the mobile station that appears in billing and account records and is accessible via web site or call-in account services.

The traffic network portion 21 of the mobile communication network 10 connects to a public switched telephone network 23. This allows the network 10 to provide voice grade call connections between mobile stations and regular telephones connected to the PSTN 23. The drawing shows one such telephone at 25. For purposes of discussing notifications, some notifications may entail voice message delivery or even service representative calls to the account holder, for example, at a regular telephone such as telephone 25 via the PSTN 23. The PSTN 23 also provides connections to other types of customer premises equipment, such as facsimile or 'FAX' machines. The drawing shows one FAX machine 27, by way of example, to illustrate the point that a subscriber or account holder notification may entail a facsimile transmission of the notification message to the subscriber's FAX machine, such as the machine 27.

The traffic network portion 21 of the mobile communication network 10 connects to a public packet switched data communication network, such as the network commonly referred to as the "Internet" shown at 29. Packet switched communications via the traffic network 21 and the Internet 29 may support a variety of user services through the network 10, such as mobile station communications of text and multimedia messages, email, web surfing or browsing, programming and media downloading, etc. For example, the mobile stations may be able to receive messages from and send messages to user terminal devices, such as personal computers, either directly (peer-to-peer) or via various servers (not separately shown). The drawing shows one such user terminal device as a personal computer (PC) at 31, by way of example. For purposes of discussing notifications, some notifications may entail an email message transmission of the notification to the subscriber's data terminal, such as to the PC 29 via the Internet 29.

Wireless carriers developed the short message service (SMS) to transmit text messages for display on the mobile stations. In many existing network architectures, the SMS traffic uses the signaling portion of the network 21 to carry message traffic between a Short Message Service Center (SMSC) 33 and the mobile stations. The SMSC supports mobile station to mobile station delivery of text messages. However, the SMSC also supports communication of messages between the mobile stations and devices coupled to other networks. For example, the SMSC 33 may receive incoming IP message packets from the Internet 29 for delivery via the network 21, one of the base stations 19 and a signaling channel over the air link to a destination mobile station. For this later type of SMS related communications, the network 10 also includes one or more Short Message Peer-to-Peer (SMPP) protocol gateways 34. The SMPP gateway provides protocol conversions, between SMPP as used by the SMSC 33 and the protocols used on the Internet 29 or other IP network. SMPP messages ride on IP transport, e.g. between the gateway 34 and the SMSC 33.

Of note for purposes of this discussion, many of the notifications discussed herein are sent to various mobile stations using SMS capabilities of the network 10. For example, when there is a change in a subscriber's account warranting notification, then the network 10 will provide an appropriate notification in the form of an SMS message sent via the SMPP gateway 34, the SMSC 33, the traffic network 21, one of the base stations 19 and a signaling channel over the air link to the mobile station 13 of the subscriber/account holder. As discussed more later, the system 10 will determine if the SMS transmission successfully provided notification to the mobile station 13, and if not will initiate one or more alternative notification procedures to other destinations designated for possible notice to the particular subscriber/account holder.

The carrier will also operate a number of systems that provide ancillary functions in support of the communications services provided through the network 10, and those elements communicate with other nodes/elements of the network 10 via one or more private IP type packet data networks 35 (sometimes referred to as an Intranet). The support elements, for example, include one or more systems of record, such as the system shown at 39. An example of such a system 39 is a Vision system, which includes subscriber account records. A large carrier typically has a number of such systems, and the system that stores the account data for a particular subscriber may be referred to as the "system of record" for that subscriber's account.

As discussed more later, with regard to FIG. 2, the customer communications system 41 also includes or has access to a preference center system 53 that forms a system of record, which includes a record for the mobile stations 13, 15 and 17. That record identifies the mobile stations 13, 15, 17, and the MDN of the mobile station identified as the account holder (AH) for subscriber notification purposes.

The exemplary network 10 also includes a customer communications system 41, which is coupled for communication via the private network 35. The customer communications system 41 receives notification requests from various other carrier systems and generates and sends the requested notifications. In some cases, the system 41 also updates information in system(s) of record, as part of its processing in response to the notification requests.

The notification requests may be generated upon significant changes, in a subscriber's account such as a change in one or more elements of the CPNI data for the account. For example, the customer communications system 41 may generate and send SMS messages, typically including at least one to the mobile station 13 designated as that of the account holder, in response to a CPNI change or other type of change in relevant account data. In the examples discussed in more detail below, the customer communications system 41 also supports alternative messaging, for example, in the form of facsimile, voice or email messages, and/or letter mailings which are used for account change notifications or the like, e.g. to provide notifications of significant account activities such as on-line access to add a number/station or to change the primary password on the account.

In practice today, the carrier will also offer its subscribers on-line access to a variety of functions related to the subscribers' accounts, such as review of billing statements and usage data, on-line payment, subscription changes, password control or the like. For that purpose, the carrier in our example operates a customer account web server 43, offering a 'MyAccount' (Now MyVerizon) type subscriber interface via the Internet. Hence, a user's terminal, such as PC 31, may be used to access on-line information about a subscriber's account, which the mobile carrier makes available via the carrier's MyAccount web site accessible through the Internet 29. Of note for purposes of the present discussions of notifications, the web site provides secure user access to enter and/or otherwise change various aspects of the subscriber's account related information. The website also may allow the subscriber to designate the MDN for the account holder's mobile station 13.

With that overview of the system, it may be helpful now to consider a high-level discussion of an example of an account change and attendant notification and update, including how these services might appear from the user or subscriber's point of view. Assume now that the subscriber has an account with the carrier operating the mobile network and has access to account related functions/services through MyAccount or MyVerizon, via the Internet 29 and the server 43. The subscriber may use the PC 31 (or web enabled mobile station, etc.) to log-in via the site offered by the server 43 to change their account information. In operation, the subscriber would use their User ID and a password to log onto their own account page at the carrier's website, after which, the subscriber can then enter new data and/or revise existing account data via the account page. By way of an example, assume that the subscriber uses this technique to change the billing address on their mobile service account. As noted, the web site also allows the subscriber to select an MDN for the AH designation, but we will assume for discussion of further examples that the subscriber selects or has previously selected the MDN for the mobile station 13 as that of the account holder.

Upon completion of the subscription change, billing address in this example, the server 43 communicates with other network systems via the private network 35, for example, to store the new address information in one or more of the systems of record 39 and 53. For example, the server 43 sends a message through the network 35 to the Vision system 39 informing that system of the account change. The server 43 also sends a notification request to the customer communications system 41, which will cause the system 41 to send one or more notifications.

The CCC request processor in customer communications system 41 will initially generate an SMS message to notify the subscriber using the previously designated account holder MDN, to notify the subscriber of the address and account holder MDN changes. If not successful, one or more alternative notifications may be sent, in accord with the applicable business rules, as discussed more later. However, the notification request from the server 43, per the business rules, also causes the CCC request processor to set the Email Address and the account holder designation appropriately in the preference center 53 if when that information is input or changed.

Figure 2:
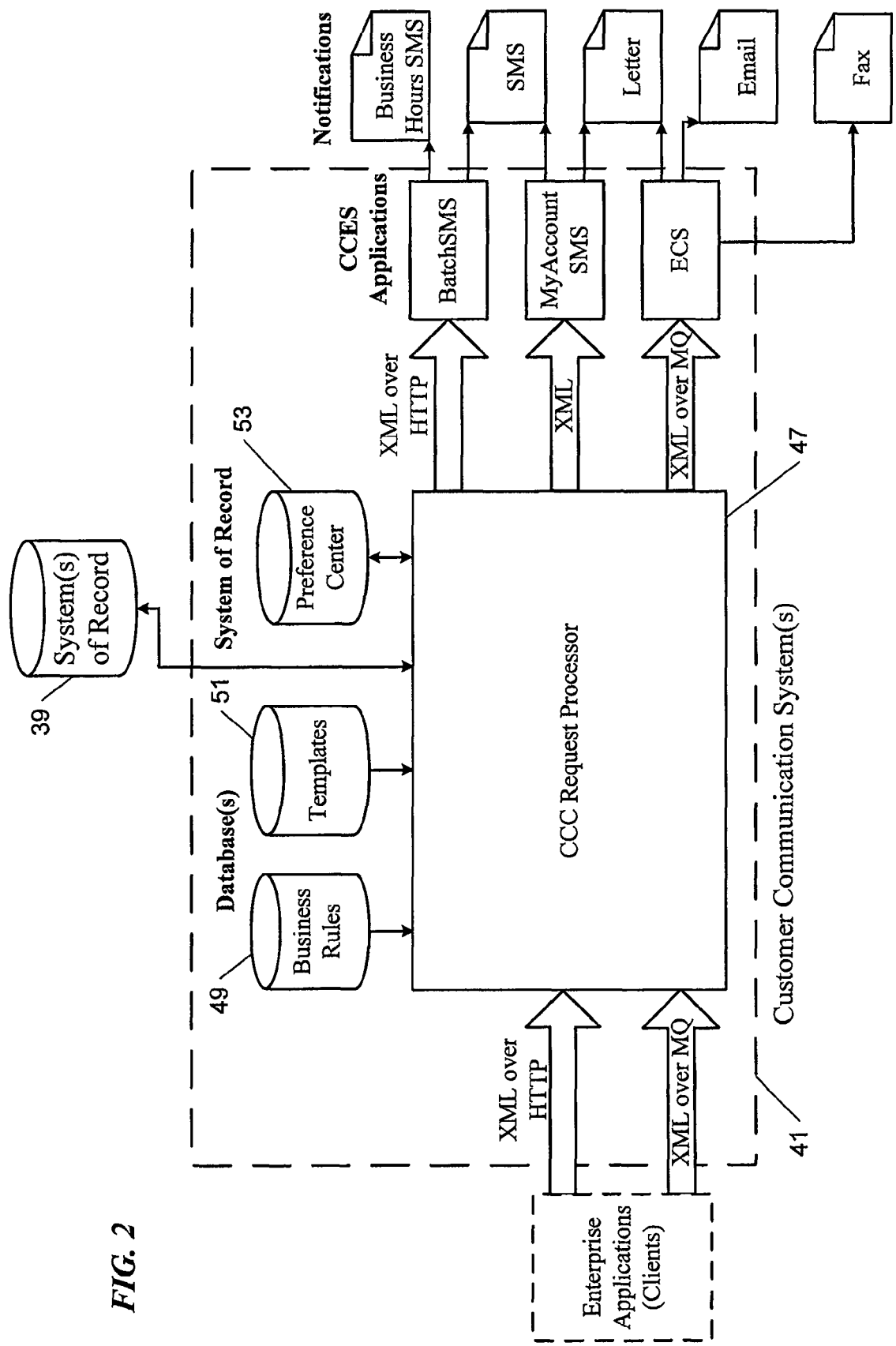
FIG. 2 is a functional block diagram useful in explaining an implementation of a customer communication system involved in providing reliable notifications to mobile subscribers.

FIG. 2 depicts software and associated functionalities, in block diagram form, where the software may be run on the hardware of a host or server type computer or system of such computers, to implement the customer communication system 41; and that drawing illustrates several other elements that communicate with that system for providing notifications to mobile users, including those provided when there is a change in relevant account information. For example, the drawing shows the systems of record 39 and 53, in this case a Vision type billing system 39 and the preference center 53. In the example, the customer communication system is implemented as an enterprise middleware web service written in Java that receives notification requests in the form of XML via HTTP or MQ, and follows business rules to send customer notifications and update systems of record. In general, these communications may utilize the CCES web services to facilitate the sending of text message, Email, letter, and fax notifications. Hence, the customer communication system 41 may be implemented as middleware, that is to say, in this example, as software for implementing a CCC notification request processor 47, one or more databases 49 and 51, and a directory 53, as will be discussed in more detail below.

Although shown as a common platform at 41 in FIG. 1, the elements of the customer communication system 41 of FIG. 2 may be implemented on separate hardware communicating with each other via a network the same as or similar to network 35. For example, one or more of the databases 49, 51 and 53 typically will be implemented as separate servers in communications with the hardware platform(s) implementing the CCC notification request processor 47, although the databases may be implemented as records and appropriate application software running on the same computer as the middleware for the CCC notification request processor 47. The preference center directory 53, for example, may be implemented as a LDAP server coupled for communication with the computer running the CCC notification request processor 47 programming.

The CCC notification request processor 47 receives notification requests, processes them and provides the processed requests to associated messaging applications that send the desired notifications out via one or more delivery techniques.

In the illustrated implementation, the CCC notification request processor 47 provides such notification services for a number of enterprise applications, particularly account change notifications. For example, enterprise applications such as MyVerizon running on the web server 43 may trigger notifications of certain activities on a subscriber's account, such as when a customer uses the on-line web service through server 43 to change their address, email address, MyAccount challenge question, MyAccount password, MyAccount secondary email addresses, or Vision password. In any such case, the CCC request processor 47 will send a notification to the customer following specific notification logic and provide fallout files by area when the notification cannot be made.

The customer communication system 41 will include or have communication access to a number of databases that store information used in performance of various notifications related functions. In the example, the customer communication system 41 includes a database 49 of business rules and a database 51 of notification message templates. The rules in the database 49 provide the logic for determining what notifications to send in response to the various CPNI Changes made on enterprise applications. The template database 51 provides the format and common content, e.g. forms or templates, for the various notification messages sent out by the system 41.

The Preference Center is the system of record for communication preferences and account holder designation. Communications with this system of record 53 provide the CCC request processor 47 with information that is useful in processing of various notifications, including notifications regarding account. The systems 53 and 41 communicate using XML, via the network 35, to store and retrieve the preference and account holder data from system 53.

Thus, the preference center directory 53 stores preference data regarding notifications for various network customer accounts that may be subject to notifications. The preference center directory 53, for example, stores the MDN of the account holder as designated by the subscriber. The directory may store other notification preference information for the subscriber account, for account change notifications and/or for other notifications that the carrier may want to provide to the subscriber, such as other notification destination addresses, etc. The language for the notification also may be specified by a field, e.g. as provisioned in the web server. The CCC request processor 47 communicates with the Preference Center application that updates its directory 53 using the Lightweight Directory Access Protocol (LDAP).

The customer communication system 41 also runs one or more message output applications, identified as CCES applications in FIG. 2, for processing the notification request messages output from the CCC notification request processor 47, as needed to generate and send the actual notification messages through one or more communication delivery channels. The CCC notification request processor 47 modifies notification request messages based on its processing and outputs the modified notification request messages in XML format to the appropriate one or more of the CCES applications, to send the actual notifications. The CCES applications comprise application programming software, which may run on the same or a different computer from the CCC notification request processor 47.

The CCES applications enable the customer communication system 41 to provide notifications, including notifications regarding account changes, and notifications for the other enterprise applications, using a number of communication techniques, as shown by way of example to the right of FIG. 2. Some messages may be batch processed for SMS communications or sent in real time in response to triggering events as represented by the MyAccount SMS processing in the drawing. Batch SMS communications may be limited to business hours if desired or sent at any time of the day. Event responsive notifications, such as those for the account change notifications, would be sent in real-time as the change events are detected and processed through the customer communication system 41. The customer communication system 41 also supports other types of notifications, such as email, letter, or facsimile transmissions via an Enterprise Communication Services (ECS) function.

The customer communication system 41 could be implemented on a single hardware platform. However, to provide effective notification services for a large number of customers and a large volume of trigger events or enterprise applications requiring notification, including various account data changes, the customer communication system 41 may utilize a distributed system architecture. The exemplary system architecture will be highly available and fault tolerant. Those skilled in the art will recognize, however, that other system architectures may be used, e.g. to meet the demands of increased event and notification traffic for account changes and/or other enterprise applications that require customer notifications.

The CCES software for notification services may be written in Java. Each CCES Notification Server node in the example has an instance of Websphere running the CCES notification software and the CCC/MyAccountSMS software on the same Java Virtual Machine (JVM). This allows the account change notifications to utilize all of the features of the customer communication system including: SMS notifications, EMS notifications, MMS notifications, Email notifications, fax notifications, letter notifications, notification templates, rules based failure notifications, preference center lookups, and weekly reports. EMS (Enhanced Messaging Service) is an application-level extension to Short Message Service (SMS) for cellular phones available on GSM, TDMA and CDMA networks. The CCC software, for example, makes the preference center lookups on the account number provided in the notification request to send SMS notifications to the Account Holder. The CCC software also updates preference center records for subscribers to reflect account changes, responsive to the account registration and change notification requests.

Figure 3:
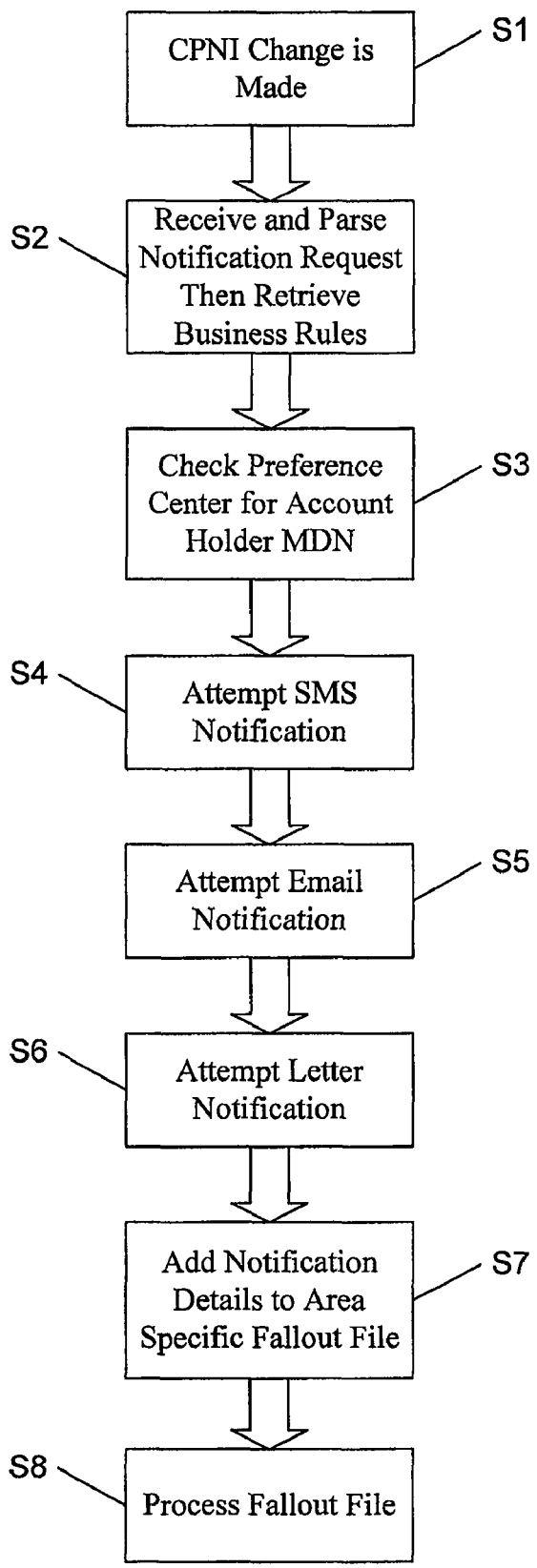
FIG. 3 is a high-level flow chart illustrating a process for sending one or more notifications upon occurrence of a change in a subscriber's mobile service account.
Figure 4:
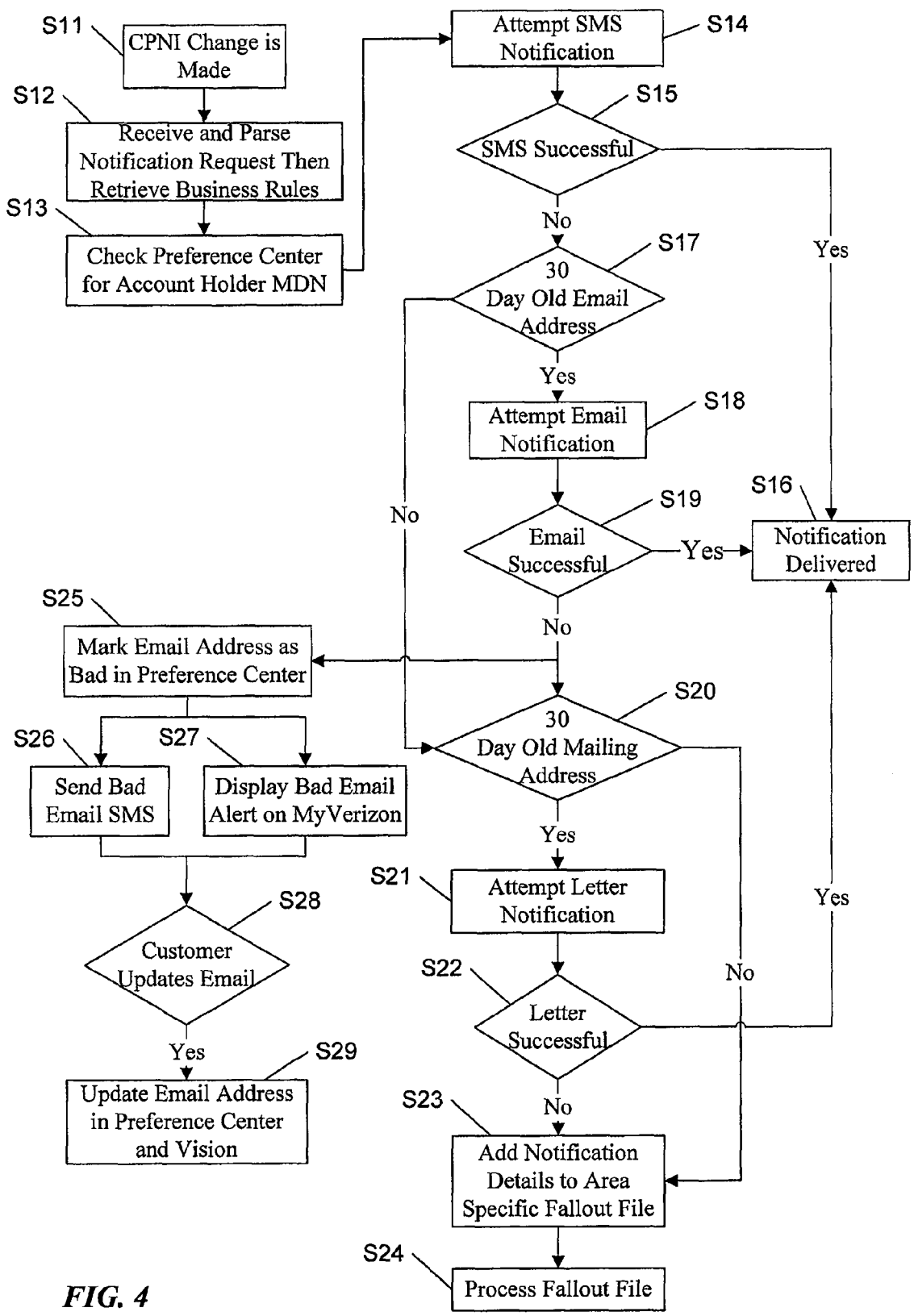
FIG. 4 is a flow chart illustrating a process similar to that of FIG. 3 but showing somewhat more details of exemplary operations for some portions of the notification procedure as well as a related update function.

The flow chart of FIG. 3 provides a high level illustration of a flow for an example of a customer account change notification procedure, as might be implemented in the system 10. FIG. 4 shows a somewhat more detailed exemplary procedure. For purposes of the discussion of these processes, we will assume that the subscriber has utilized the MyVerizon web site functionality via the server 43 to change an account parameter. Examples of such a change may include a change of their address, a change of their email address, a change of their MyAccount or MyVerizon associated account challenge question, a change of their associated account password, a change of their associated account secondary email addresses, a change of their Vision password, or a change of a subscriber/account holder designation (e.g. of the MDN under the account for purposes of subscriber notification using SMS or the like). For ease of discussion of FIG. 3, we will initially assume that the subscriber associated with mobile stations 13, 15 and 17 has changed their account password.

The change notification processing (FIG. 3) begins with detection of a significant account change, referred to as a CPNI change in the example. In our example, this may occur when the subscriber accesses the MyVerizon account via the web server 43 and changes the password (or makes one of the other types of account changes that are significant in that they require attendant subscriber notification). In the mobile communication network 10 of FIG. 1, the server 43 detects the change and generates and sends a notification request message with the relevant information to the customer communication system 41. At step S1 in the process of FIG. 3, the CCES notification server 55 receives the notification request message, essentially as the trigger for notification to the subscriber of the change in account status/information. From the overall point of view of the network 10, the server 43 initially detects the change. However, from the point of view of the customer communication system 41, the system 41 detects the change by receiving the notification request message regarding the change from the server 43.

The notification request message includes the information in respective data fields, as needed to generate and send the desired notification(s), including for example an indication of the type of event causing the infraction, identification of the account, the changed information, etc. If necessary, the message may be parsed (e.g. if received in a different native format). At step S2, the CCC notification request processor 47 uses a request type identification in the received notification request message, to access the business rule database 49, to retrieve one or more applicable business rules.

For change notification, the applicable business rule indicates that there is a preference lookup and may indicate which one of several possible types of lookup is to be performed. In the example of FIG. 3, in step S3, the CCC notification request processor 47 performs an LDAP lookup to a system of record, that is to say the preference center directory 53 in the implementation of FIG. 2, to obtain the MDN of the account holder's mobile station 13 and email address. The lookup may also provide other delivery point destination information, e.g. for alternative destinations as discussed more, later.

In step S4, the CCC notification request processor 47 processes the notification request, in an initial attempt to deliver the change notification by SMS. In this example, the processing at S4 therefore entails generation of an SMS message addressed to the MDN of the account holder's mobile station 13. This will typically involve obtaining a template of the appropriate notification message from the database 51 and filling-in appropriate fields of the template with the relevant data, obtained from the notification request message and/or from the system of record lookup in step S3. In our example, the notification indicates a password change. In the example, notifications do not include the changed information for security purposes.

In step S4, the customer communication system 41 sends the SMS message for the account holder's MDN (i.e. intended for the mobile station 13), via the network 35, the SMPP gateway 34 to the SMSC 33. The SMSC 33 typically stores the message and attempts to notify the appropriate mobile station 15, to allow the mobile station to obtain delivery via the network 21, a base station 19 and the over-the-air communication link. If successfully delivered, the SMSC 33 provides an acknowledgement back to the sender, in this case, the customer communication system 41, and notification processing would be complete.

However, in the example of FIG. 3, we will now assume that the SMS notification attempt has failed. Hence, at step S5, the customer communication system 41 will generate an email notification message for the subscriber. In this example, the processing at S5 therefore involves generation of an email message (similar to the earlier SMS message but in an email format/protocol). The email message is addressed using an address of the subscriber obtained as part of the preference center lookup (from S3). Message generation again may involve obtaining a template of the appropriate notification message from the database 51 and filling-in appropriate fields of the template with the relevant data, obtained from the notification request message and/or from the system of record lookup in step S3.

In step S5, the customer communication system 41 sends the email message addressed to the email address of the subscriber, for example, through the networks 35 and 29 to an email server (not separately shown) providing email service for the customer. The server will hold the message until accessed by and delivered to the subscriber's terminal, e.g. to a PC of the subscriber such as that shown at 31 in FIG. 1. If not successfully delivered, the email server may provide a non delivery receipt message back to the sender, in this case, the customer communication system 41, and notification processing would proceed to the next step.

In our example, we will again assume that the notification attempt has failed, in this case, the email was not delivered to the subscriber either. Upon failure of the electronic delivery techniques, the customer communication system 41 can generate one or more further delivery attempts. Automated voice calls or possibly even operator/attendant type telephone calls can be tried. It is also contemplated that the system 41 may initiate a facsimile type communication. In our example (FIG. 3), however, we will assume that the next delivery attempt relates to sending a conventional letter. Hence, in S6, the customer communication system 41 may communicate with a letter generation system such as a printer and inserter system (not separately shown) to generate a hard copy letter and associated mailing envelope, based on an appropriate template and completion of the notification with information from the request and a billing system lookup. The letter will be addressed using the subscriber's mailing address for billing purposes, from the preference center or there may possibly be a lookup in another system of record such as a billing system.

In step S6, the customer communication system 41 sends the hardcopy letter addressed to the subscriber, for example, by presentation to the postal service for regular delivery to the customer. However, if again there is a failure, e.g. no valid mailing address, then the customer communication system 41 will detect yet a further failure of the attempted notification delivery.

Although other automated attempts could be made (before or after the attempted letter communication), in the example of FIG. 3 it is assumed that automated delivery to this subscriber is not feasible. Hence, in step S7, the customer communication system 41 adds the details regarding the failed notification to a "fallout" file. The information identifies the subscriber and the account change for which the subscriber was to have been notified. The detailed information may also indicate the types of notification deliveries that have failed and/or any information about possible reasons for any or all of the failures. At step S8, the fallout file is processed. The notification from our example and any other similarly failed notification attempts are handled by an exception procedure. This exception procedure might include an automated call attempt utilizing an interactive voice response (IVR) system.

For example, the fallout file may be provided to one or more operators, who will attempt to call affected subscribers identified in the file and manually deliver various failed notifications. Telephone calls to notify a particular subscriber may be directed to any of the Account Holder contact numbers under the subscriber's account with the mobile service provider and/or to a landline telephone number if one is available for the subscriber.

The flow chart of FIG. 4 shows some aspects of exemplary processing by the customer communication system 41 in somewhat more detail. Processing begins at step S11 when there is a trigger of notification regarding an account change. The notification request message is received and parsed (S12), and the CCC request processor 47 retrieves the appropriate business rules (S12), essentially the same as steps S1 and S2 in the process discussed above relative to FIG. 3. As discussed above, the notification request message includes the information in respective data fields, as needed to provide the notification to the subscriber. At S13, based on information from the notification request message, the CCC notification request processor 47 accesses the business rule database 49, to retrieve one or more applicable business rules (in a manner similar to the operation in step S3 of FIG. 3).

In step S14, the customer communication system 41 attempts an SMS message notification, to the mobile station 13 of the subscriber, based on the account holder MDN obtained in the preference center lookup in step S13. In step S15, the CCC notification request processor 47 determines whether or not the SMS notification attempt has been successful, e.g. has a delivery acknowledgement been received back via the SMSC 33. If so (Yes branch from S15), then the notification has been delivered to the subscriber; and processing ends accordingly at step S16.

Returning to the decision at step S15, assume now that the SMS notification attempt failed. For example, the customer communication system 41 may have failed to receive the SMS message delivery acknowledgement back via the SMSC 33 within a predetermined interval. Hence, the CCC notification request processor 47 determines at S15 that the SMS notification attempt has been unsuccessful, and processing branches to step S17 (No branch from S15).

In step S17, the CCC notification request processor 47 determines if the data for the subscriber in the preference center includes an email address for the subscriber that is at least 30 days old. For email notifications, the primary email address in the Preference Center for the subscriber (based on MDN or MTN of the account) will only be used if it is 30 days old or older. If there is no email address or the email address has recently changed (less than 30 days old), the processing branches from S17 to step S20, after which the system implements letter notification procedures, as will be discussed more, later.

For now, we will assume that the primary email address in the Preference Center for the subscriber is at least 30 days old (Yes branch from step S18). Hence, at this point in our example (step S18), the customer communication system 41 will attempt email notification. As outlined earlier, the system 41 generates an email notification message for the subscriber addressed using the primary email address of the subscriber obtained as part of the preference center lookup (from S13). In step S18, the customer communication system 41 sends the email message addressed to the email address of the subscriber, for example, through the networks 35 and 29, and an email server, for delivery to a PC 31 or other data terminal of the subscriber.

In step S19, the CCC notification request processor 47 determines whether or not the email notification attempt has been successful. If so (Yes branch from S19), then the notification has been delivered to the subscriber; and processing ends accordingly at step S16.

Returning to the decision at step S19, assume now that the email notification attempt also failed, therefore processing takes the No branch from step S19. Two different sequences of events/processing steps begin from this branch in the example of FIG. 4. We will first discuss those steps that relate to further notification attempts. Hence, the failure of the email notification as detected at S19 begins processing with regard to a possibility of a letter notification at step S20. As noted earlier, S20 also may have been reached if the determination at S17 indicated that there was not an email address for the subscriber that was at least 30 days old.

For letter notifications in this example, a call will be made to the Vision system, e.g. system 39 in FIG. 1, requesting a mailing address for the subscriber. In step S20, the CCC notification request processor 47 determines if the data for the subscriber includes a regular mailing address for the subscriber that is at least 30 days old. If not (no such address or too recent), then the processing branches from S20 to step S23, at which notification details for this change notification are added to a fallout file, for exception processing, as will be discussed more, later.

For now, we will assume that the mailing address for the subscriber is at least 30 days old (Yes branch from step S20). Hence, at this point in our example (step S21), the customer communication system 41 will attempt to send/deliver a letter type notification. As outlined earlier, the system 41 may communicate with a letter generation system such as a printer and inserter system (not separately shown) to generate a hard copy letter and associated mailing envelope, based on an appropriate template and completion of the notification with information from the request and the Vision lookup. The letter will be addressed using the subscriber's mailing address for billing purposes, from Vision or other billing system of record. In step S21, the customer communication system 41 initiates communication of the hardcopy letter addressed to the subscriber, for example, by presentation to the postal service for regular delivery to the customer. For convenience of illustration and discussion here, the drawing shows a simplified approach to letter processing and subsequent exception or fallout processing in the event that the letter notification is unsuccessful. Hence, in our simple example, in step S21, a hardcopy letter addressed to the subscriber is sent out, for example, by presentation to the postal service for regular delivery to the customer. At step S22, a determination is made as to whether or not the letter notification delivery was successful. If so (Yes branch from S2), then the notification has been delivered to the subscriber; and processing ends accordingly at step S16.

Returning to the decision at step S22, assume now that the letter notification attempt also failed. In event of such a failure, in our example, the processing branches from the determination in step S22 to step S23. As noted earlier, in our simple example, step S23 also may have been reached from S20, in the event that there was no mailing address of 30 days old or older available for the subscriber in question. In step S23, the customer communication system 41 adds the details regarding the failed notification to a "fallout" file. The information identifies the subscriber and the account change for which the subscriber was to have been notified. The detailed information may also indicate the types of notification deliveries that have failed and/or any information about possible reasons for any or all of the failures.

At step S24, the fallout file is processed. The notification from our example and any other similarly failed notification attempts are handled by an exception procedure. This exception procedure might include an automated phone call to the subscriber using an IVR system. As another example, the fallout file may be provided to one or more operators, who will attempt to call affected subscribers identified in the file and manually deliver various failed notifications. Telephone calls to notify a particular subscriber may be directed to the Account Holder MDN under the subscriber's account or to a Can Be Reached (CBR) number with the mobile service provider or to a landline telephone number if one is available for the subscriber.

The simple example of FIG. 4 assumed the same fallout processing occurred, if there was a lack of a 30 day old mailing address and after failure of the attempted notification by letter. In actual practice, the mailing and attendant processing may be somewhat more complex. For example, lack of a 30 day old mailing address might lead to the processing of steps S23-S24, as described above. However, letter processing and attendant failure follow-up would be somewhat different. Instead, at step S22, the customer communication system 41 might send a letter request to a UIM system and hand off responsibility for delivering the letter notification to the subscriber. In this case, the processing by the customer communication system 41 ends accordingly at step S16. UIM is the system that handles the generation, printing, and sending of letters for Verizon Wireless CPNI changes. The return address(es) used for such notification letters directs failed letters to be sent to the specific area of the carrier's operations that is responsible for fallout processing for the particular regions of the subscribers, so that the standard manual intervention can begin. For example, when the postal authority returns a notification letter to the respective area servicing a subscriber whose account changed, then an operator in that area might initiate a phone call to that subscriber.

As noted earlier, the detection of failed email at step S19 (performed after an email notification attempt using a primary subscriber email address was found to be at least 30 days old at steps S17-19) triggers two parallel processes. The further notification steps of S20-S24 are as described above. The other steps S25-S29 relate to a procedure to obtain and update a subscriber email address, for future notification purposes.

Hence, in the example, after the negative determination (email notification failure) at S19, the CCC notification request processor 47 will mark the email address as 'Bad' in the preference center 53 (step S25). This should prevent use of the address that produced the failure in any future attempts to provide an email notification, as should be determined by the absence of a good email address (that is 30 days old or older) at step S17 in future notification operations for this subscriber account. The system 41 will also attempt to inform the subscriber of the email address problem. Hence, at S26, the customer communication system 41 sends an SMS notification message using a procedure similar to that discussed above relative to step S14. In S26, the SMS message informs the subscriber of the bad email address and requests the subscriber to provide a new/updated email address that is valid and operable. At S27, the customer communication system 41 also communicates with the web server 43 to post an alert message against the subscriber's account information on the MyVerizon web site. If the subscriber accesses their account, the server 43 will provide a web page providing the subscriber with notice of the failure of the email delivery and again asking the subscriber to provide a new/updated email address that is valid and operable.

The subscriber can access their account via the MyVerizon web site, as discussed earlier. Following either of the notifications at S26 or S27 regarding the email failure, the web site can offer the subscriber a mechanism to update their email address (as shown at S28 in FIG. 4).

The server 43 will treat the email address update as another change event triggering a notification. Hence, the server will send a notification request message identifying the subscriber account to the customer communication system 41. The customer communication system will go through its routine for notifying the subscriber essentially as described above, e.g. to provide an SMS notification of the email address change to the subscriber's mobile station, etc. However, the notification request regarding an email address change will cause the system to retrieve and apply a business rule with an associated system of record update function. Although the system 41 will perform the step in response to the new notification request, for simplicity the update function is shown at S29, after the email update. In step S29, the CCC request processor 47 communicates with other network systems via the private network 35, for example, to store the new email address for the particular subscriber account in the applicable systems of record for that subscription information. In the example, the CCC request processor 47 communicates the new email address to the preference center 53 and to the Vision billing system 39, for storage in those systems of record 39 and 53.

As shown by the above discussion, functions relating to the detection of an account change by a mobile station or its user and the attendant notification services to the subscriber/account holder may be implemented on computers connected for data communication via the components of various network, configured to provide mobile communication services and related service features, as shown in FIGS. 1 to 3. Although special purpose devices may be used, such computers also may be implemented using one or more hardware platforms intended to represent a general class of data processing device commonly used to run "server" and/or "client" programming so as to implement the functions discussed above, albeit with an appropriate network connection for data communication.

As known in the data processing and communications arts, a general-purpose computer typically comprises a central processing unit (CPU) or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the business rules, template and preference center databases. The software code is executable by one or more general-purpose computers, for example, that function as the server(s) forming the customer communication system. In operation, the respective code is stored within the particular general-purpose computer platform. At other times, however, the software may be stored at other locations and/or transported for loading into the appropriate computer platform. Execution of such code by a processor of the computer platform enables the platform to implement the respective processing steps of the account change detection and notification methodology, in essentially the manner performed in the implementations discussed and illustrated herein.

FIGS. 6 and 7 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer (PC) or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Hence, aspects of the methods of providing notifications of account related activities to mobile service subscribers and attendant updates of a system of record outlined above may be embodied in programming. Program aspects of the technology may be thought of as a "product" or "article of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the network operator or carrier into the computer platform of the data aggregator and/or the computer platform(s) that serve as the customer communication system. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, optical or magnetic disks, such as any of the storage devices in any computer(s) or the like, such as may be used to implement the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementations described above utilized SMS type messages as the initial notification messages to the subscriber or account holder, with regard to a relevant account-related activity, other electronic messages to their mobile stations may be used for those primary notifications, such as EMS or MMS type messages. The hierarchy of alternative messaging, in the event of failure to deliver the primary notifications may also be revised, to optimize costs or likelihood of delivery.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX I: ACRONYM LIST

The description above has used a large number of acronyms to refer to various services, messages and system components. Although generally known, use of several of these acronyms is not strictly standardized in the art. For the convenience of the reader, the following list correlates terms to acronyms, as used in the detailed description above.

AH—Account Holder
API—Application Programming Interface
APP—Application ID
BS—Base Station
BTS—Base Transceiver System
CBR—Can Be Reached
CD—Compact Disk
CD-ROM—Compact Disk-Read Only Memory
CCC—Centralized Customer Communications
CCES—Customer Care Enterprise Services
CCS—Customer Communications System
CPNI—Customer Proprietary Network Information
CSS—Content Services Switch
DNS—Domain Name Service
DVD—Digital Video Disk
DVD-ROM—Digital Video Disk-Read Only Memory
ECS—Enterprise Communication Services
EMS—Enhanced Messaging Service
EEPROM—Electrically Erasable Programmable Read Only Memory
EPROM—Erasable Programmable Read Only Memory
FCC—Federal Communications Commission
GSS—Global Site Selector
HTTP—Hypertext Transfer Protocol
ID—Identifier
IP—Internet Protocol
IR—InfraRed
IVR—Interactive Voice Response
JVM—Java Virtual Machine
LDAP—Lightweight Directory Access Protocol
MDN—Mobile Director Number
MIN—Mobile Identification Number
MMS—Multimedia Message Service
MQ—Message Queuing
MS—Mobile Station
MSG—Message numbers
MTN—Mobile Telephone Number
PROM—Programmable Read Only Memory
PSTN—Public Switched Telephone Network
RAM—Random Access Memory
RAN—Radio Access Network
RF—Radio Frequency
ROM—Read Only Memory
SMPP—Short Message Peer-to-Peer
SMS—Short Message Service
SMSC—Short Message Service Center
TCP—Transmission Control Protocol
TCP/IP—Transmission Control Protocol/Internet Protocol
TOS—Type of Service
UC—Usage Control
UIM—Universal Invoice Module
VZW—VeriZon Wireless
WAN—Wide Area Network
XML—eXtensible Markup Language

What is claimed is:

1. A method for providing notifications of changes on a mobile station's account to a holder of the mobile station's account, the method comprising steps of:
    detecting a change on a mobile station's account stored in a database;
    retrieving destination information on the holder of the mobile station's account from the database storing the destination information of the holder of the mobile station's account, the retrieved destination information including information for a plurality of respective destinations for the holder for a plurality of different delivery procedures;
    determining whether or not a first destination for a first one of the delivery procedures has not changed for at least a predetermined period; and
    sending a first notification of the change on the mobile station's account to the holder of the mobile station's account via the first delivery procedure according to the first destination, only if the first destination for the first delivery procedure has not changed for at least the predetermined period.

2. The method of claim 1, further comprising a step of:
    sending a second notification of the change on the mobile station's account to the holder of the mobile station's account via a second delivery procedure, upon a determination that the first notification has not been successfully sent to the holder of the mobile station's account.

3. The method of claim 2, wherein, if the second notification is not successfully sent to the holder of the mobile station's account, an additional notification of the change on the mobile station's account is sent consecutively via a different delivery procedure.

4. The method of claim 3, further comprising:
    determining whether or not a second destination for the second delivery procedure and/or the destination for the different delivery procedure have not been changed for at least the predetermined period; and
    wherein the sending of the second notification and the additional notification to the holder are performed when the second destination and the destination for the different delivery procedure have not been changed for at least the predetermined period.

5. The method of claim 1, wherein the change on the mobile station's account includes at least one of: change of address, change of email address, change of password and change of identification of the account holder.

6. The method of claim 3, wherein each of the first, the second, and the different delivery procedures sends one of a Short Message Service (SMS) message, an Enhanced Messaging Service (EMS) message, a Multimedia Messaging Service (MMS) message, an email, a fax, a voice call and a letter.

7. The method of claim 1, wherein the destination information includes a Mobile Directory Number (MDN) of the account holder's mobile station and an email address, and one or more of a fax number, a landline telephone number, and a postal address of the account holder.

8. The method of claim 3, wherein one of the destinations for the first, the second and the additional notification is recorded if the one of the first, the second and the additional notification is successfully sent to the account holder.

9. The method of claim 3, wherein a fallout file including the account holder, the change of the account, and types of failed notifications is recorded if all of the first, the second and the additional notification are not successfully sent to the account holder.

10. The method of claim 3, wherein the first delivery procedure is less costly than the second delivery procedure, and the second delivery procedure is less costly than the different delivery procedure.

11. A system for providing notifications of changes on a mobile station's account to a holder of the mobile station's account, the system comprising:
 a database for storing information on mobile stations' accounts and destination information on holders of the mobile stations' accounts;
 a customer account server for detecting a change on a mobile station's account;
 a customer communication server for sending a first notification of the change on the mobile station's account to the holder of the mobile station's account via a first delivery procedure upon detection of the change on the mobile station's account by the customer account server, wherein the first notification is sent to the account holder when a first destination for the first delivery procedure has not changed for at least a predetermined period.

12. The system of claim 11, wherein, if the first notification is not successfully sent to the account holder, the customer communication server sends a second notification to the account holder via a second delivery procedure.

13. The system of claim 12, wherein, if the second notification is not successfully sent to the account holder, the customer communication server sends an additional notification of the change on the mobile station's account consecutively via a different delivery procedure.

14. The system of claim 13, wherein each of the first, the second, and the different delivery procedure sends one of a Short Message Service (SMS) message, an Enhanced Messaging Service (EMS) message, a Multimedia Messaging Service (MMS) message, an email, a fax, a voice call and a letter.

15. The system of claim 13, wherein the customer communication server is configured for:
 determining whether or not a second destination for the second delivery procedure and/or the destinations for the different delivery procedure have not been changed for at least the predetermined period; and
 implementing the sending of the second notification and the additional notification to the holder when the second destination and the destination for the different delivery procedure have not been changed for at least the predetermined period.

16. The system of claim 11, wherein the change on the mobile station's account includes at least one of: change of address, change of email address, change of password and change of identification of the account holder.

17. The system of claim 11, wherein the destination information includes a Mobile Directory Number (MDN) of the account holder's mobile station and an email, and one or more of a fax number, a landline telephone number, and an address of the account holder.

18. The system of claim 13, wherein the first delivery procedure is a SMS message, the first destination uses a MDN of the mobile station of the account holder as an address, and the SMS message is sent to the mobile station via a wireless network.

19. The system of claim 18, wherein the second delivery procedure is an email, the second destination is an email address of the account holder, and the email is sent to the email address of the account holder via an email server.

20. The system of claim 19, wherein the different delivery procedure is a letter, and the destination for the different delivery procedure is a postal address of the account holder.

21. The system of claim 15, wherein one of the destinations for the first, the second and the additional notification is recorded in the database if the one of the first, the second and the additional notification is successfully sent to the account holder.

22. The system of claim 15, wherein a fallout file indicating the account holder, the change of the account, and types of failed notifications is recorded if all of the first, the second and the additional notification are not successfully sent to the account holder.

23. The system of claim 15, wherein the first delivery procedure is less costly than the second delivery procedure, and the second delivery procedure is less costly than the additional delivery procedure.

24. A processor-readable storage medium tangibly embodying a set of processor-executable instructions, wherein execution of the instructions causes a processor to perform operations comprising:
 detecting a change on a mobile station's account stored in a database;
 retrieving destination information on the holder of the mobile station's account from the database storing the destination information of the holder of the mobile station's account, the retrieved destination information including information for a plurality of respective destinations for the holder for a plurality of different delivery procedures; and
 determining whether or not a first destination for a first one of the delivery procedures has not changed for at least a predetermined period; and
 sending a first notification of the change on the mobile station's account to the holder of the mobile station's account via the first delivery procedure according to the first destination, only if the first destination for the first delivery procedure has not changed for at least the predetermined period.

25. The processor-readable storage medium of claim 24, wherein the operations further comprise:
 sending a second notification of the change on the mobile station's account to the holder of the mobile station's account via a second delivery procedure, upon a determination that the first notification has not been successfully sent to the holder of the mobile station's account.

26. The processor-readable storage medium of claim 24, wherein, if the second notification is not successfully sent to the holder of the mobile station's account, an additional notification of the change on the mobile station's account is sent via a different delivery procedure.

27. The processor-readable storage medium of claim 26, wherein:
 the operations further comprise determining whether or not a second destination for the second delivery procedure and/or the destination for the different delivery procedure have not been changed for at least the predetermined period; and
 the sending of the second notification and the additional notifications to the holder is performed when the second destination and the destination for the different delivery procedure have not been changed for at least the predetermined period.

28. The processor-readable storage medium of claim 26, wherein each of the first, the second, and the different delivery procedures is one of a Short Message Service (SMS) message, an Enhanced Messaging Service (EMS) message, a Multimedia Messaging Service (MMS) message, an email, a fax, a voice call and a letter.

29. The processor-readable storage medium of claim 26, wherein the destination information includes a Mobile Directory Number (MDN) of the account holder's mobile station and an email address, and one or more of a fax number, a landline telephone number, and a postal address of the account holder.

30. The processor-readable storage medium of claim 26, wherein one of the destinations for the first, the second and the additional notification is recorded in the database, if one of the first, the second and the additional notification is successfully sent to the account holder.

31. The processor-readable storage medium of claim 26, wherein a fallout file indicating the account holder, the change of the account, and types of failed notifications is recorded if all of the first, the second and the additional notification are not successfully sent to the account holder.

32. A method for providing notifications of changes on a mobile station's account to a holder of the mobile station's account, the method comprising steps of:
    detecting a change on a mobile station's account stored in a database;
    retrieving destination information on the holder of the mobile station's account from the database storing the destination information of the holder of the mobile station's account, the retrieved destination information including a field for an email address of the mobile station's account holder and an identification of at least one other possible destination for notifications of change on the mobile station's account;
    sending a first notification of the change on the mobile station's account to the holder of the mobile station's account using the retrieved destination information; and
    upon determining that the field for the email address does not contain an address meeting a predetermined criteria, obtaining an email address from the holder of the mobile station's account; and
    populating the obtained email address into the email address field of the destination information.

33. The method of claim 32, wherein the first notification is sent as an email using an initial email address contained in the field, and
    identifying the initial email address as a wrong email address for the holder upon a failure of delivery of the email first notification; and
    the obtaining step includes
    notifying the account holder that the email address is the wrong email address via a different delivery procedure, requesting the account holder to update the correct email address, and
    receiving the correct address provided from the account holder in the database.

34. The method of claim 32, wherein the first notification of the change on the mobile station's account is sent to the holder of the mobile station's account via the email, only if the email address of the holder has not changed for at least a predetermined time.

35. The method of claim 32, further comprising:
    sending a second notification of the change on the mobile station's account to the holder of the mobile station's account via a different delivery procedure when the first notification is not successfully sent to the holder.

36. The method of claim 32, wherein the email address of the holder is stored in the database as the email address of the holder when the first notification is successfully sent to the holder.

37. The method of claim 33, wherein the different delivery procedure includes sending a short messaging service (SMS) message to the account holder's mobile station, notifying the account holder that the email address is the wrong email address.

38. The method of claim 33, wherein the different delivery procedure includes posting an alert message on a webpage for the account holder provided by a mobile service provider via which the account holder checks his or her account information, notifying the account holder that the email address is the wrong email address.

39. A processor-readable storage medium tangibly embodying a set of processor-executable instructions, wherein execution of the instructions causes a processor to perform operations comprising:
    detecting a change on a mobile station's account stored in a database;
    retrieving destination information on the holder of the mobile station's account from the database storing the destination information of the holder of the mobile station's account, the retrieved destination information including a field for an email address of the mobile station's account holder and an identification of at least one other possible destination for notifications of change on the mobile station's account;
    sending a first notification of the change on the mobile station's account to the holder of the mobile station's account using the retrieved destination information; and
    upon determining that the field for the email address does not contain an address meeting a predetermined criteria, obtaining an email address from the holder of the mobile station's account; and
    populating the obtained email address into the email address field of the destination information.

40. The processor-readable storage medium of claim 39, wherein the first notification is sent as an email using an initial email address contained in the field, and
    identifying the initial email address as a wrong email address for the holder upon a failure of delivery of the email first notification; and
    the obtaining step includes
    notifying the account holder that the email address is the wrong email address via a different delivery procedure, requesting the account holder to update the correct email address, and
    receiving the correct address provided from the account holder in the database.

41. The processor-readable storage medium of claim 39, wherein the first notification of the change on the mobile station's account is sent to the holder of the mobile station's account via the email, only if the email address of the holder has not changed for at least a predetermined time.

42. The processor-readable storage medium of claim 39, further comprising:
    sending a second notification of the change on the mobile station's account to the holder of the mobile station's account via a different delivery procedure when the first notification is not successfully sent to the holder.

43. The processor-readable storage medium of claim 39, wherein the email address of the holder is stored in the database as the email address of the holder when the first notification is successfully sent to the holder.

* * * * *